United States Patent
Shiga et al.

(10) Patent No.: US 7,606,859 B2
(45) Date of Patent: Oct. 20, 2009

(54) MULTIMEDIA COMMUNICATION SYSTEM

(75) Inventors: Kenta Shiga, Yokohama (JP); Junji Fukuzawa, Yokohama (JP); Keiko Tanigawa, Kawasaki (JP); Masashi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 10/388,225

(22) Filed: Mar. 14, 2003

(65) Prior Publication Data

US 2004/0083282 A1 Apr. 29, 2004

(30) Foreign Application Priority Data

Oct. 29, 2002 (JP) ............... 2002-313613

(51) Int. Cl.
 *G06F 15/16* (2006.01)
 *G06F 15/173* (2006.01)
(52) U.S. Cl. .................. 709/204; 709/224
(58) Field of Classification Search ......... 709/203–206, 709/227, 224
 See application file for complete search history.

(56) References Cited

U.S. PATENT DOCUMENTS 6,243,398 B1 6/2001 Kahane et al.
6,678,719 B1 * 1/2004 Stimmel ............. 709/204
7,035,923 B1 * 4/2006 Yoakum et al. ............. 709/224
2002/0024947 A1 2/2002 Luzzatti et al.
2003/0135624 A1 * 7/2003 McKinnon et al. .......... 709/228

FOREIGN PATENT DOCUMENTS

JP 05-227303 9/1993
WO WO 00/41533 7/2000

* cited by examiner

*Primary Examiner*—Yemane Mesfin
(74) *Attorney, Agent, or Firm*—McDermott Will & Emery LLP

(57) ABSTRACT

A multimedia communication system having at least one terminals capable of multimedia communication, a user information storage for storing the information on the users of the terminals, a terminal information storage for storing the information on the terminals and a media information storage for storing the occupied/unoccupied status of one or more communication media capable of being used at the terminals, wherein the occupied/unoccupied status of all the communication media for a designated user are read from the media information storage, the dynamic situation of the user is read from the user information storage, and the occupied/unoccupied status thus read is changed in accordance with one or more rules including the conditions for the dynamic situation and the contents of change in the occupied/unoccupied status.

17 Claims, 11 Drawing Sheets

FIG.2

POLICY MANAGEMENT TABLE 18

| USER ID | CONDITION | OPERATION |
|---------|-----------|-----------|
| * | $presence = "ENGAGED" | all.all = "OCCUPIED" |
| a | $presence = "LINE BUSY" | all.voice = "OCCUPIED" |
| a | $presence = "ABSENT" | this.all = "OCCUPIED" |
| b | not $caller = "a" | all.all = "OCCUPIED" |
| . . . | . . . | . . . |

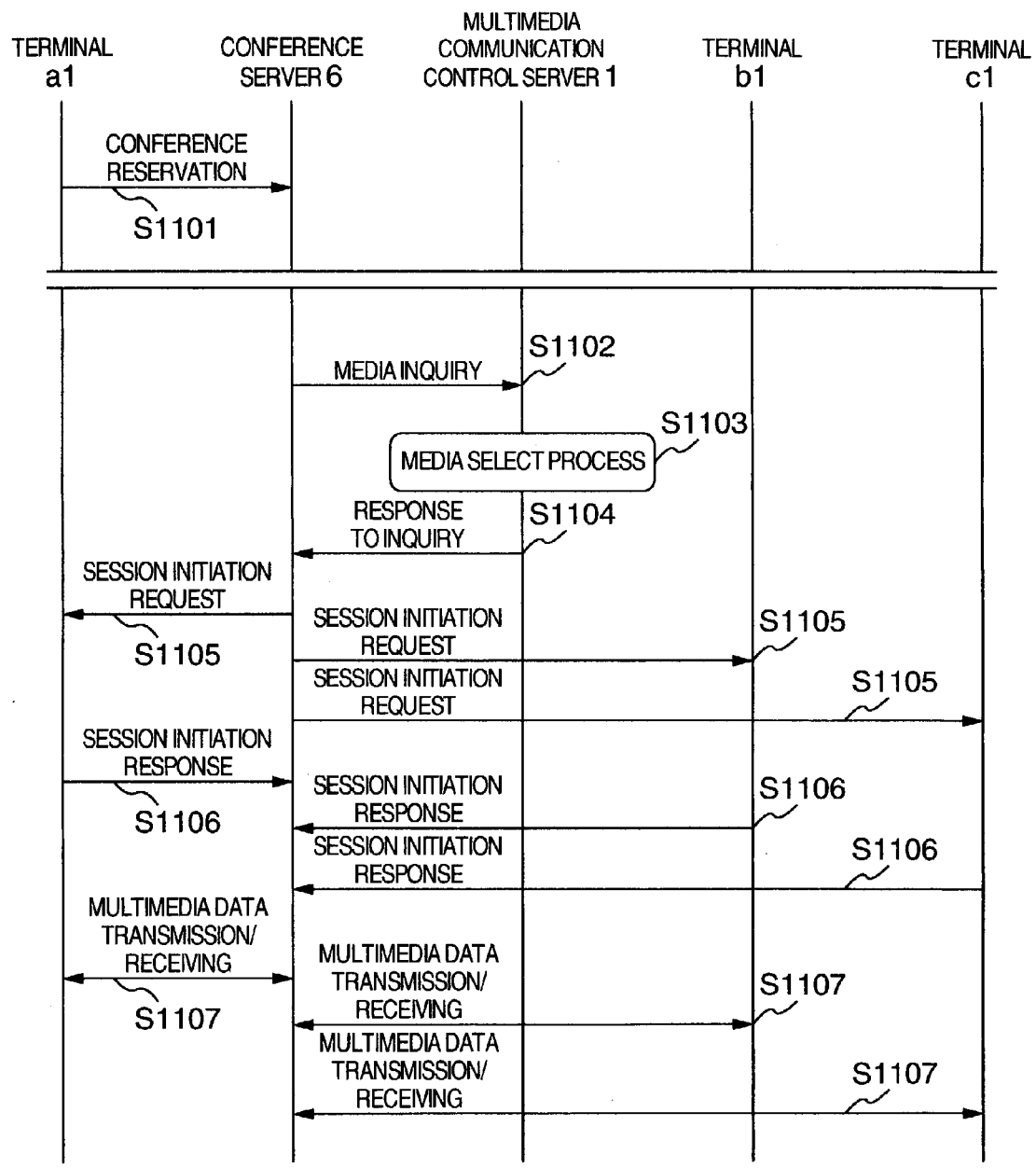

FIG.12A
TERMINAL MANAGEMENT TABLE 15

| USER ID | TERMINAL ID | PRIORITY | COMMUNICATION INFORMATION |
|---------|-------------|----------|---------------------------|
| a | a1 | 1 | 192.168.0.1 : 4567 |
| a | a2 | 2 | 192.168.0.2 : 4567 |
| b | b1 | 1 | 192.168.0.3 : 4567 |
| ... | ... | ... | ... |

FIG.12B
MEDIA STATUS MANAGEMENT TABLE 16

| TERMINAL ID | MEDIA ID | OCCUPIED/UNOCCUPIED STATUS |
|-------------|----------|----------------------------|
| a1 | text | UNOCCUPIED |
| a2 | voice | UNOCCUPIED |
| b1 | voice | UNOCCUPIED |
| ... | ... | ... |

FIG.12C
PRESENCE MANAGEMENT TABLE 17

| USER ID | TERMINAL ID | PRESENCE INFORMATION |
|---------|-------------|----------------------|
| a | a1 | ON-LINE |
| a | a2 | ABSENT |
| b | b1 | LINE BUSY |
| ... | ... | ... |

MULTIMEDIA COMMUNICATION SYSTEM

INCORPORATION BY REFERENCE

This application claims priority based on a Japanese patent application, No. 2002-313613 filed on Oct. 29, 2002, the entire contents of which are incorporated herein by reference.

BACKGROUND OF THE INVENTION

The present invention relates to a multimedia communication system comprising a plurality of information processing units connected to a network.

With the progress of the wireless LAN technologies including IEEE 802.11b and the inexpensive high-speed access network technologies such as ADSL (Asymmetric Digital Subscriber Line), the service that provides connectivity to the Internet from public spaces such as railway stations and coffee shops is extending. Also, broadbandization of the mobile communications service is extending as the result of commercialization of the third-generation portable telephone. The utilization of these services makes possible the on-line communication with multimedia such as texts, voices and video by connecting to the Internet, at any time or place, using a highly portable terminal such as a laptop personal computer (PC) or a personal digital assistant (PDA).

Under these circumstances, it is considered to become a common practice for a user to use different terminals at different places. For example, a desk-top PC may be used in the office, while a PDA may be the choice in a moving train. On the other hand, the laptop PC may be a popular means for use in public spaces such as a railway station. For the multimedia communication services, therefore, techniques for selecting a receiving terminal of a receiver-user (hereinafter referred to as the receiving user) upon transmission from the user on transmitting side (hereinafter referred to as the transmitting user) become crucial.

A technique for selecting a receiving terminal is described in JP-A-5-227303 for example. According to this technique, terminal groups, priorities of each terminal in the groups and the information as to whether each of communication media (such as texts, voices, video, etc. which are hereinafter collectively referred to as the media) is busy (occupied) or unbusy (unoccupied) are stored in a central control unit connected to a switching unit. Upon arrival of multimedia data to a terminal group, the occupied/unoccupied status of the medium of each terminal of the group is checked in accordance with the priority, and the data is allowed to be received in the case where the designated medium is unoccupied.

In the technique described above, a terminal group can be registered in such a manner that terminals of one user belong to the same group. In this way, the user who uses a plurality of different terminals on different occasions can receive the data by one of his/her terminals with the highest priority. With the conventional technique described above, however, the priority is assigned to each terminal in advance, and therefore the receiving terminal cannot be selected in accordance with the user's dynamic situation. Also, the conventional technique, in which the transmitting user is not informed of a medium that the receiving user can use at a particular time point, may not be able to establish communication between the transmitting user and the receiving terminal which may be occupied.

In view of this, an improved multimedia communication control technique is in demand.

SUMMARY OF THE INVENTION

This invention provides a method of selecting a receiving terminal for multimedia communication based on the dynamic situation of the receiving user as well as the priority assigned to each terminal.

Also, this invention provides a technique whereby the transmitting user can grasp usable media in advance and select a medium from them.

Specifically, according to this invention, there is provided a multimedia communication system comprising at least one terminal capable of multimedia communication and a control server for storing the presence information of the user operating the particular terminal, the priority of the particular terminal operated by the user and the occupied/unoccupied status of one or a plurality of communication media available at the particular terminal, characterized in that the control server changes the occupied/unoccupied status in accordance with at least one of the policies including the operation of changing the occupied/unoccupied status in accordance with the presence information.

Further, after changing the occupied/unoccupied status, the control server checks the occupied/unoccupied status of one or more predesignated media of each terminal of the receiving user in the preassigned descending order of priority and selects a terminal with all the media unoccupied as a receiving terminal.

In the aforementioned aspect of the invention, assume that the user who has set a higher priority to a desk-top PC than that of a PDA goes out carrying the PDA with the desk-top PC switched on. Unlike in the prior art, the desk-top PC is not selected as a receiving terminal, but the PDA can be selected reflecting the situation that the user is "absent" on the desk-top PC.

Also, as long as the user is "engaged" and undesirous of being interrupted such as when he/she prepares sensitive documents or attends a meeting, any communication request can be rejected by all the terminals.

In the case where the user is conducting a multimedia communication using voice, on the other hand, other voice communication requests can be rejected by all the terminals reflecting the "line busy" situation. Further, in view of the fact that a communication by a text is generally possible during a call, communication requests by a text can be permitted.

According to this embodiment, the multimedia communication with a user having a plurality of different terminals at different places can be established by selecting an appropriate terminal in accordance with the dynamic situation of the user.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 is a diagram showing a data structure of a policy management table.

FIG. 11 is a diagram showing a communication sequence according to a fifth embodiment.

FIG. 12A is a diagram showing an example configuration of a terminal management table.

FIG. 12B is a diagram showing an example configuration of a media status management table.

FIG. 12C is a diagram showing an example configuration of a presence management table.

DETAILED DESCRIPTION OF THE EMBODIMENTS

Figure 1:
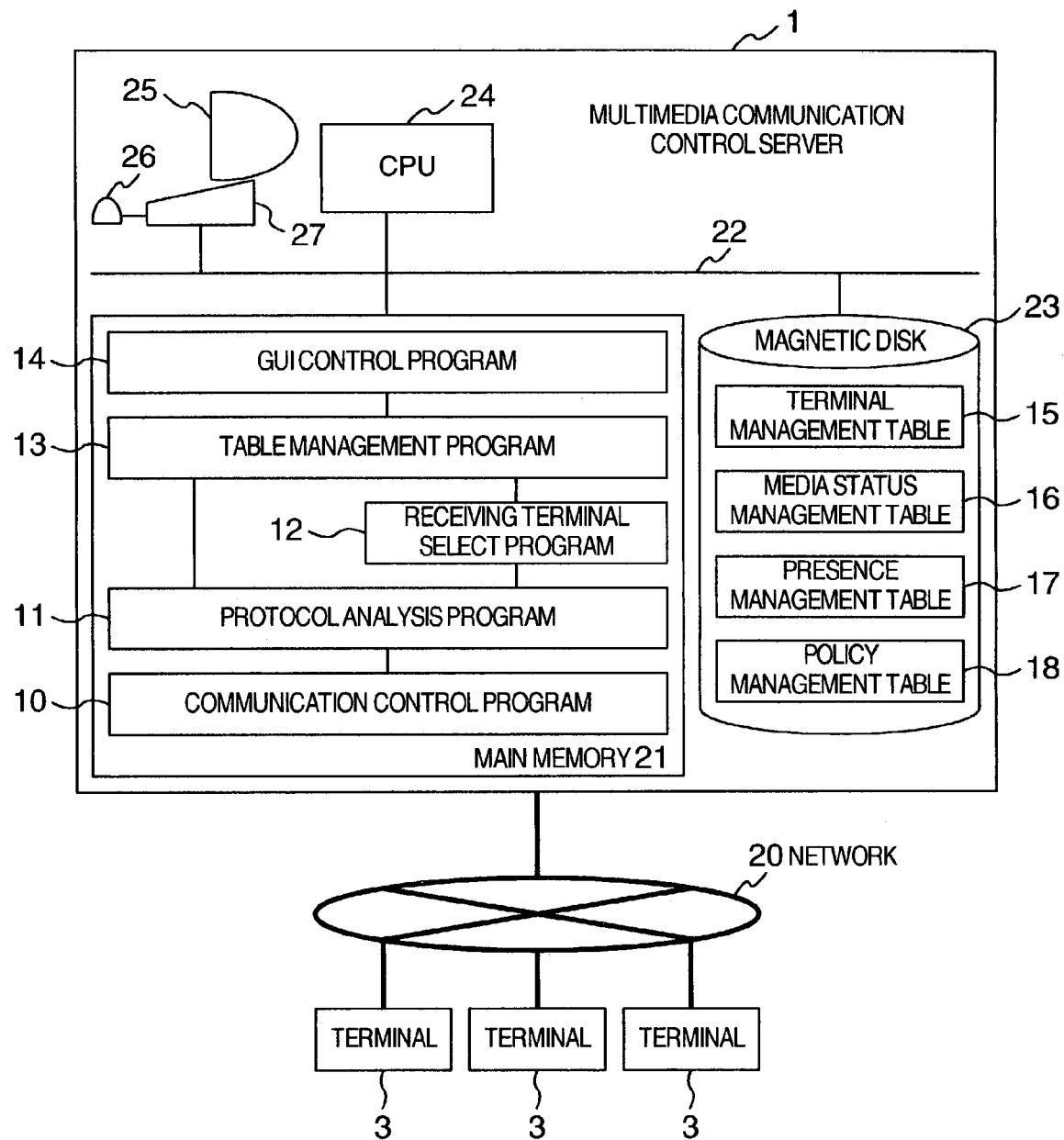
FIG. 1 is a diagram showing a system configuration of a multimedia communication control server according to each embodiment.

Embodiments of this invention will be explained below with reference to the drawings. In the drawings, the same component parts are designated by the same reference numerals, respectively.

A first embodiment, as shown in FIG. 1, represents a multimedia communication system in which a multimedia communication control server (hereinafter referred to as the control server) 1 and conventional terminals 3 are connected to each other by a network 20 such as LAN.

The control server 1 is configured of a central processing unit (hereinafter referred to as the CPU) 24, a secondary storage unit such as a hard disk (hereinafter referred to as the magnetic disk) 23, a main storage unit (hereinafter referred to as the main memory) 21, a communication line 22 such as a bus, an output device such as a display unit (hereinafter referred to as the display) 25, a character input device 27 such as a keyboard and a pointing device 26 such as a mouse, a touch panel or a stylus pen. The control server 1 is connected with other devices through the network 20 such as LAN.

The main memory 21 has stored therein a communication control program 10 for controlling the communication with other devices through the network 20, a protocol analysis program 11 for analyzing the communication protocol for multimedia communication services, a receiving terminal select program 12 for selecting a receiving terminal of a user, a table management program 13 for executing the read/write operation from/into various tables and a GUI control program 14 for providing the system manager with a graphical user interface.

These programs are stored in a magnetic disk 23 in advance or by being read from a portable storage medium or by being downloaded from other servers through the network, and after being transferred to the main memory 21 as required, executed by the CPU 24.

The magnetic disk 23 has stored therein a terminal management table 15 for storing the terminal of each user and the priority of the terminal thereof, a media status management table 16 for storing the type of media usable at each terminal, a presence management table 17 for storing the dynamic attributes (hereinafter referred to as the presence information) of each user, and a policy management table 18 for storing the rules (hereinafter referred to as the policy) for selecting a receiving terminal based on the conditions including the presence information.

The presence information is the information used mainly by the IM (Instant Messaging) service, and according to this embodiment, includes the communicability such as the absence or an engaged state, and the user activities such as a line busy state.

The terminal management table 15, the media status management table 16 and the presence management table 17 have array structures and can store one or more records sequentially. Each record of the terminal management table 15, as shown in FIG. 12A, consists of a user ID 201 for uniquely identifying a user, a terminal ID 1502 for uniquely identifying the terminal of the user, the priority 1503 of the terminal, and communication information 1504 such as an IP address required for communication. Each record of the media status management table 16, as shown in FIG. 12B, consists of a terminal ID 1502, a media ID 1603 for identifying one or more media usable at the terminal and an occupied/unoccupied status 1604 of each medium. Each record of the presence management table 17 includes, as shown in FIG. 12C, a user ID 201, one or more terminal IDs 1502 and the presence information 1703 of each terminal of a particular user.

The presence information 1703 takes one of the following values; "on-line" indicating that the terminal 3 is connected to the network, "off-line" indicating that the terminal 3 is not connected to the network, "absence" indicating that the terminal 3 is connected to the network but the user is away from the terminal 3, "engaged" indicating that the terminal 3 is connected to the network but the user is very busy and "line busy" indicating that the user is on the phone.

The value representing the connection state such as "on-line" or "off-line" is notified to the control server 1, for example, when the terminal 3 is powered on or off, respectively, and set by the table management program 13 of the control server 1 to the presence information 1703 of the record indicating the particular terminal of the presence management table 17.

The values representing the communicability such as "absence" and "engaged" are notified by the terminal 3 to the control server 1, for example, in response to the presence information select operation by the user and set by the table management program 13 of the control server 1 to the presence information 1703 of the record indicating the particular terminal of the presence management table 17. In the case where the user does not operate the terminal 3 for a predetermined length of time, the "absence" may be notified to the control server 1 by the terminal 3.

The value representing the user activities such as "line busy" is notified by the terminal 3 to the control server 1, for example, when the user manipulates the terminal 3 to make a phone call, and set by the table management program 13 of the control server 1 to the presence information 1703 of the record indicating the particular terminal of the presence management table 17.

FIG. 2 shows a data structure of the policy management table 18 for storing the policies. The policy management table 18 has an array structure and can store one or more records sequentially. Each record of the policy management table 18 consists of a user ID 201, a condition 202 for selecting a receiving terminal and an operation 203 performed upon satisfaction of the condition. The expression "$presence" on the left side of the condition 202 indicates the presence information of the user identified by the user ID 201 and that on the right side the value of the presence information.

The condition 202 of the record 204, for example, indicates that the presence information of the user "a" is "line busy". The left side of the operation 203 assumes the form of "terminal.medium", and the right side the occupied/unoccupied status of the terminal and the medium, respectively, designated on the left side. The operation 203 of the record 204, for example, indicates that statuses of voice of all the terminals are set in "occupied" state, and the operation 203 of the record 205 that all the media of the terminals satisfying the condition are set in "occupied" state.

In the case where a predetermined character string such as * is stored as the user ID 201, it can be considered to indicate a rule applicable to all the users. In the case where the character string "$caller" is stored on the left side of the condition 202, on the other hand, it can be considered to represent the condition for the transmitting user. Further, it may be determined that the logical expression such as "and", "or" or "not" can be used for the condition 202.

For example, the record 206 indicates that all the media of all the terminals are set in "occupied state" in the case where the transmitting user is other than "a". As a result, the access control by user can be realized. Further, in the case where the character string "$time" is stored on the left side of the condition 202, it may indicate the condition for time. As an example of the condition for time, the terminal assigned to each employee of a company is added as a receiving terminal during the time from 10 to 17 o'clock.

The condition 202 and the operation 203 may be expressed in other than the method shown in FIG. 2.

Next, an explanation will be given of the graphical user interface (GUI) according to this embodiment.

Figure 3:
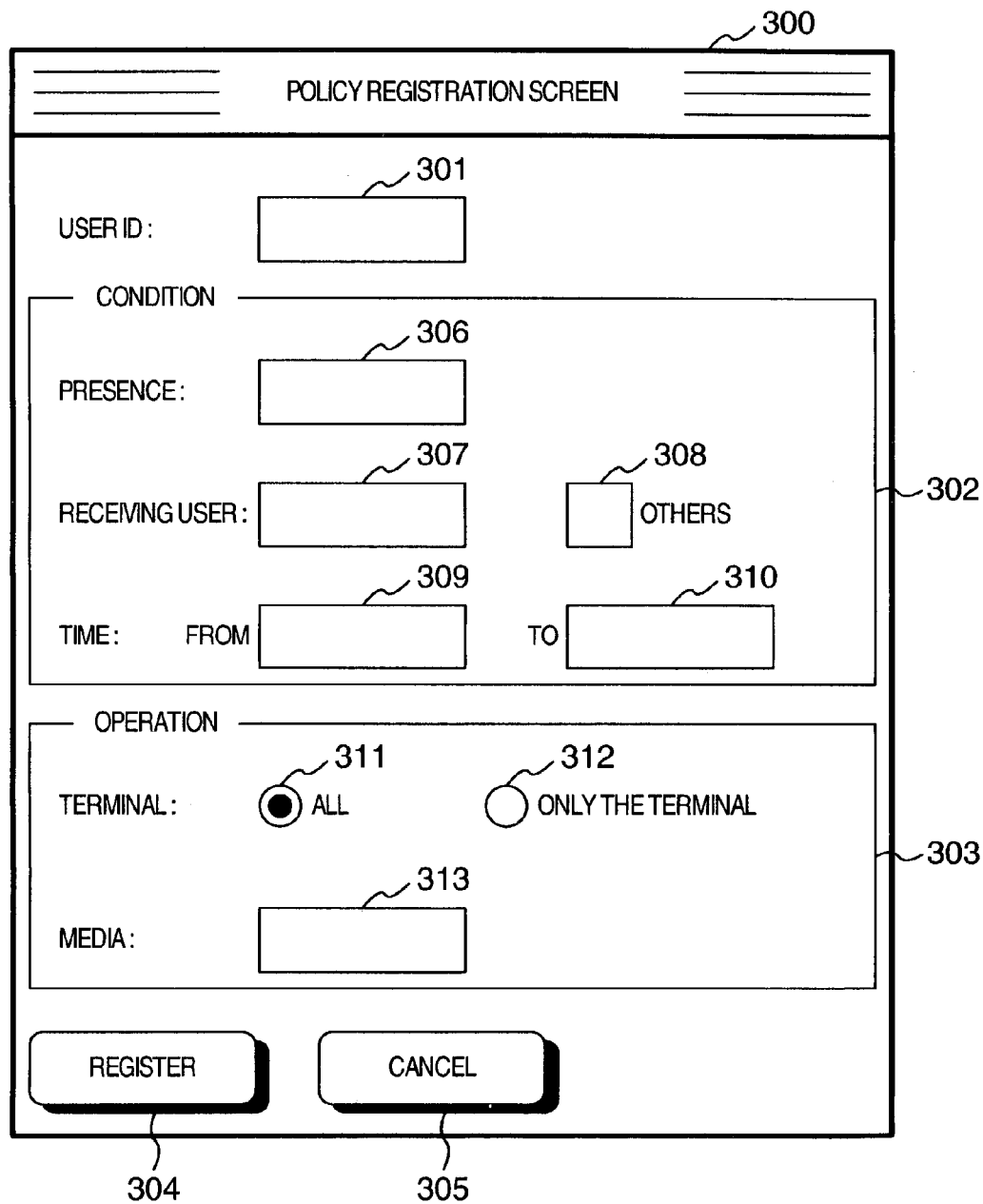
FIG. 3 is a diagram showing a display example of a policy registration screen.

FIG. 3 shows an example of display of the policy registration screen 300 used by the user or the system manager to register a policy. The policy registration screen 300 is displayed on the display 25 by the GUI control program 14 of the control server 1, so that the user or the system manager sets each parameter using the character input device 27, the pointing device 26 or the like.

The policy registration screen 300 consists of an area 301 for inputting the user ID of the user governed by the particular policy, an area 302 for designating the condition, an area 303 for designating the operation, a button 304 for registering the policy designated by the aforementioned parameters and a button 305 for canceling the registration of the policy. Further, the area 302 includes an area 306 for inputting the value of the presence information, an area 307 for inputting the user ID of the receiving user, a check box 308 for designating other than the user ID input in the area 307, and areas 309, 310 for designating the time. The area 303 includes a button 311 for designating all the terminals intended for operation, a button 312 for designating only a terminal(s) satisfying the condition designated in the area 302 and an area 313 for inputting the type of the medium.

Upon depression of the registration button 304, the table management program 13 of the control server 1 adds a new record to the policy management table 18 in accordance with the parameters set. As an alternative, a device other than the control server 1 displays the policy registration screen 300, so that the user or the system manager may register the policy using the particular device.

Next, the communication sequence and the processing sequence according to this embodiment will be explained.

Figure 4:
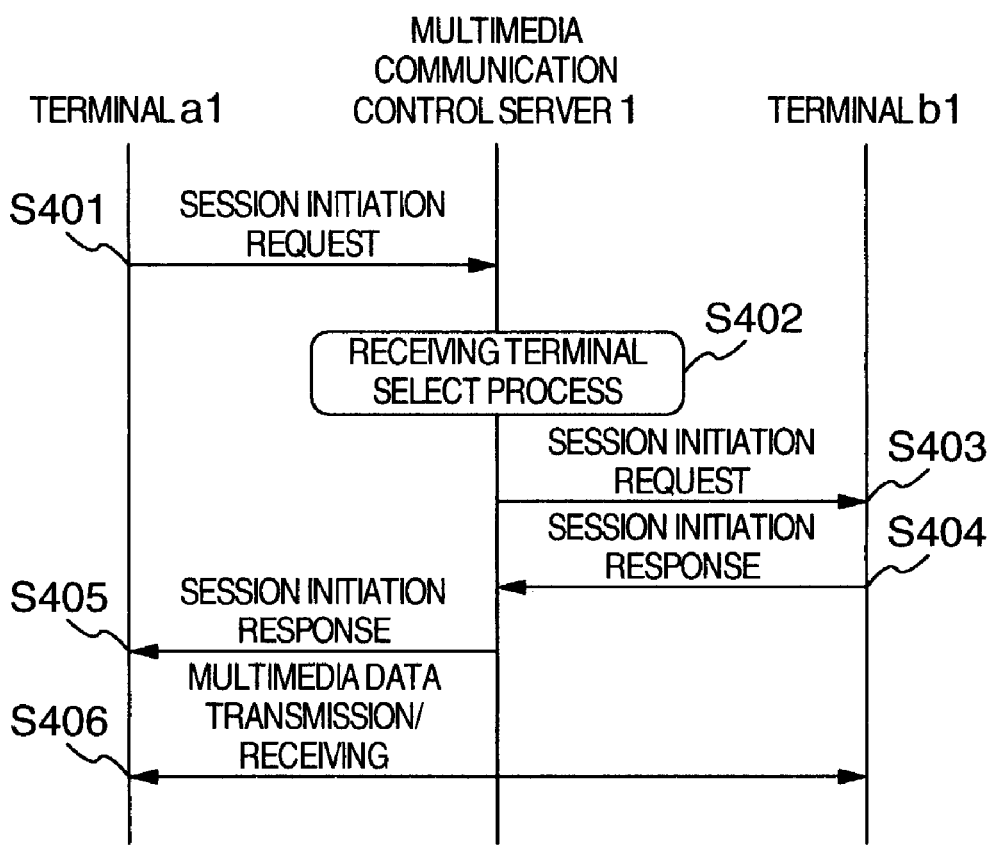
FIG. 4 is a diagram showing a communication sequence according to the first embodiment.

FIG. 4 shows a communication sequence for the user a to transmit the signal for multimedia communication to the user b through the terminal a1. First, the terminal a1 issues a session initiation request to the control server 1 for multimedia communication with the user b (S401). This session initiation request includes the user IDs of the transmitting user and the receiving user, the media ID of one or more media requested by the transmitting user and information (for example, the IP address or the port address) for carrying out communication with the terminal a1.

As soon as the communication control program 10 of the control server 1 receives the session initiation request, the protocol analysis program 11 retrieves the information contained in the session initiation request such as the user IDs of the transmitting user and the receiving user, and executes the receiving terminal select process (S402). The session initiation request is transferred to the selected terminal (b1 in FIG. 4) by the communication control program 10 (S403). The receiving terminal select process will be explained later with reference to FIG. 5.

The terminal b1, upon receipt of the session initiation request, sends a session initiation response, which is transferred to the terminal a1 by the communication control program 10 of the control server 1 (S404, S405). In the last step, the terminal a1 establishes connection with the terminal b1 using the information (such as the ID address or the port number) for communication with the terminal b contained in the session initiation response, after which the multimedia data are transmitted and received through this connection channel.

In step S406, the connection for transmitting/receiving the multimedia data between the terminals may be established alternatively through a server (not shown in FIG. 4) for relaying the multimedia data in order to communicate through the NAT (Network Address Translation) device or collect the logs intensively.

Figure 5:
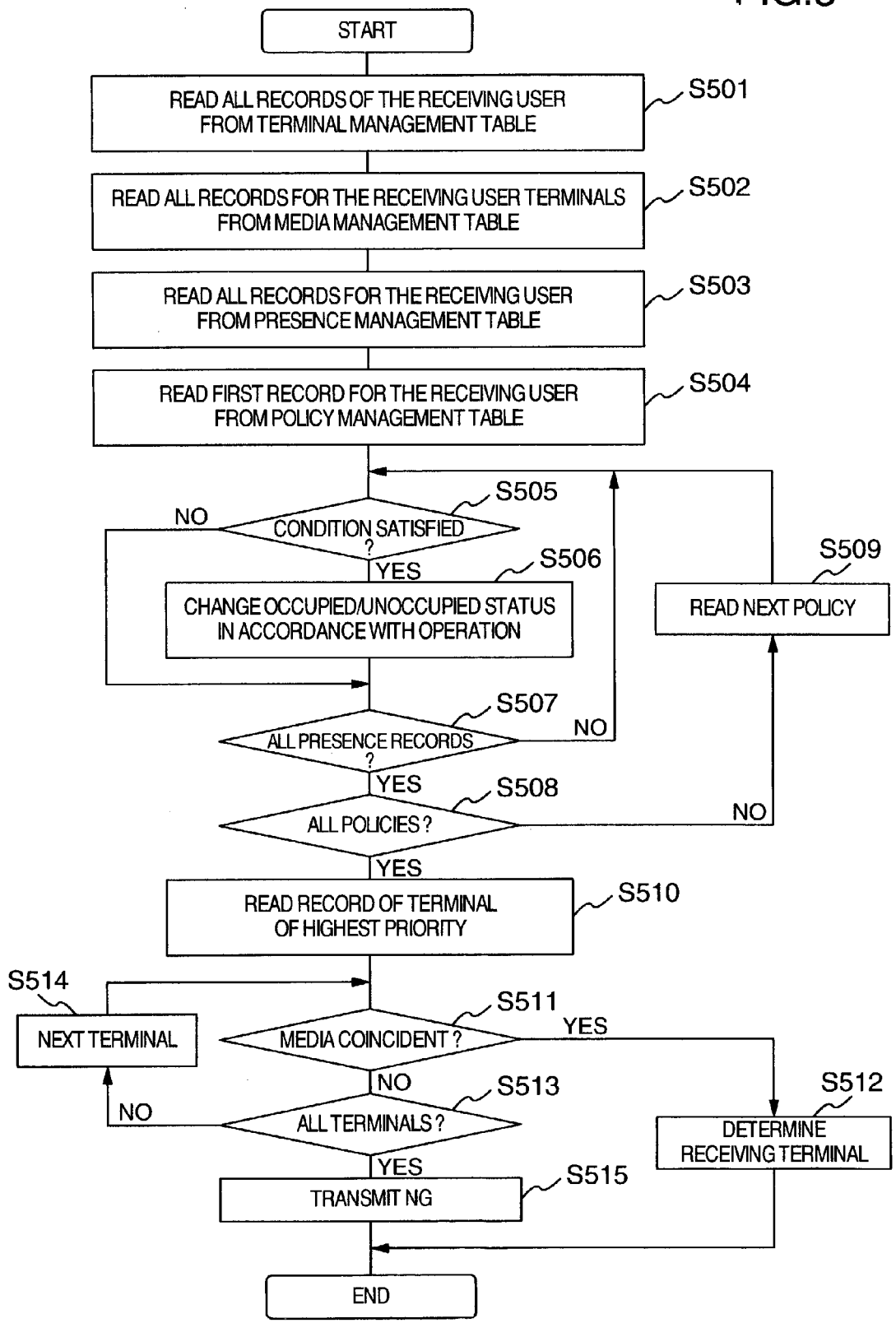
FIG. 5 is a diagram showing a processing sequence for the receiving terminal select process according to the first embodiment.

Next, the receiving terminal select process (S402) of the control server 1 will be explained with reference to FIG. 5. The receiving terminal select process is divided into two phases. In the first phase, the terminals of the receiving user are checked and the occupied/unoccupied status of each medium of the terminals is changed temporarily based on the policy. In the second phase, the receivability of each terminal of the receiving user with the media designated in the session initiation request is determined in the descending order of priority based on the occupied/unoccupied status of the media thus changed.

In the first phase, the table management program 13 reads all the records for the designated receiving user from the terminal management table 15 (step S501). Further, all the records for the terminals of the receiving user are read from the media status management table 16 (step S502). The records read in step S502 are saved in the main memory 21 together with the priority of the terminals in preparation for the subsequent processes. All the records for the receiving user are read from the presence management table 17 (step S503). Next, the first record for the receiving user is read from the policy management table 18 (step S504). The order in which steps S501 to S504 are executed may be changed.

The receiving terminal select program 12 checks whether the presence information 1703 in the first record read in step S503 satisfies the condition 202 of the policy read in step S504 (step S505), and in case of satisfaction, updates the occupied/unoccupied status of the media status management record saved in the main memory 21 in step S502 in accordance with the operation 203 of the record in step S504 (step S506). In case of dissatisfaction, on the other hand, the processes of and after step S507 are executed.

Next, the receiving terminal select program 12 executes the process of steps S505, S506 for all the records read in step S503 (step S507). Then, the table management program 13 checks whether the record of the policy for the receiving user still exists in the policy management table 18 (step S508), and in case of existence, reads the next record (step S509) and executes the process of steps from S505 to S507.

In the second phase, the table management program 13 reads all the records for the terminal with highest priority from the media status management table 16 saved in the main memory 21 (step S510). The receiving terminal select program 12 determines the media usable at the particular terminal based on the occupied/unoccupied status and the media type of the records, and also determines whether they coincide with the media designated in the session initiation request (step S511).

In case of coincidence, the particular terminal is determined as a receiving terminal (step S512). In case of incoincidence, on the other hand, the process of steps from S510 to S512 is repeated for other terminals in the descending order of priority (steps S513, S514). In case of incoincidence after processing all the records, an error is sent as a response indicating the non-existence of a terminal coinciding with the designated media (step S515).

According to this embodiment, the client program for multimedia communication of each terminal carries out communication with the control server 1 and adds the record of the media available for use by the particular terminal as unoccupied in the media status management table 16 at the time of activation. At the time of deactivation, on the other hand, the client program deletes the record for the terminal from the media status management table 16. In view of the fact that the terminal may switch off power without executing the normal deactivation process, however, the terminal may establish communication with the control server 1 at regular intervals of time, so that the table management program 13 of the control server 1 deletes the record for the terminal not carrying out communication at least for a predetermined length of time, from the media status management table 16.

Also, the various table stored in the magnetic disk 23 may be stored in another magnetic disk of the large-capacity storage management device connected through the network 20 so that the table management program 13 may perform the read/write operation through the network 20. Especially in the case where the control server 1 is arranged distributively among a plurality of domains, the various tables are preferably stored in a single large-capacity storage management device. By so doing, instead of mutual communication between the control servers 1, the control server 1 on the transmitting side can access directly to the various tables stored in the large-capacity storage management device in the domain on the receiving side. Thus, the multimedia communication over domains is facilitated.

In the first embodiment described above, the control server 1 selects the receiving terminal after considering the policy. In this way, the terminal for receiving the session of multimedia communication can be selected after considering the dynamic situation of the user.

Next, a second embodiment will be explained. According to this embodiment, the control server 1, the terminal 4 and the existing session control data relay server (hereinafter referred to as the relay server) 2 are connected by the network 20 such as LAN, thereby making up a multimedia communication system.

Figure 6:
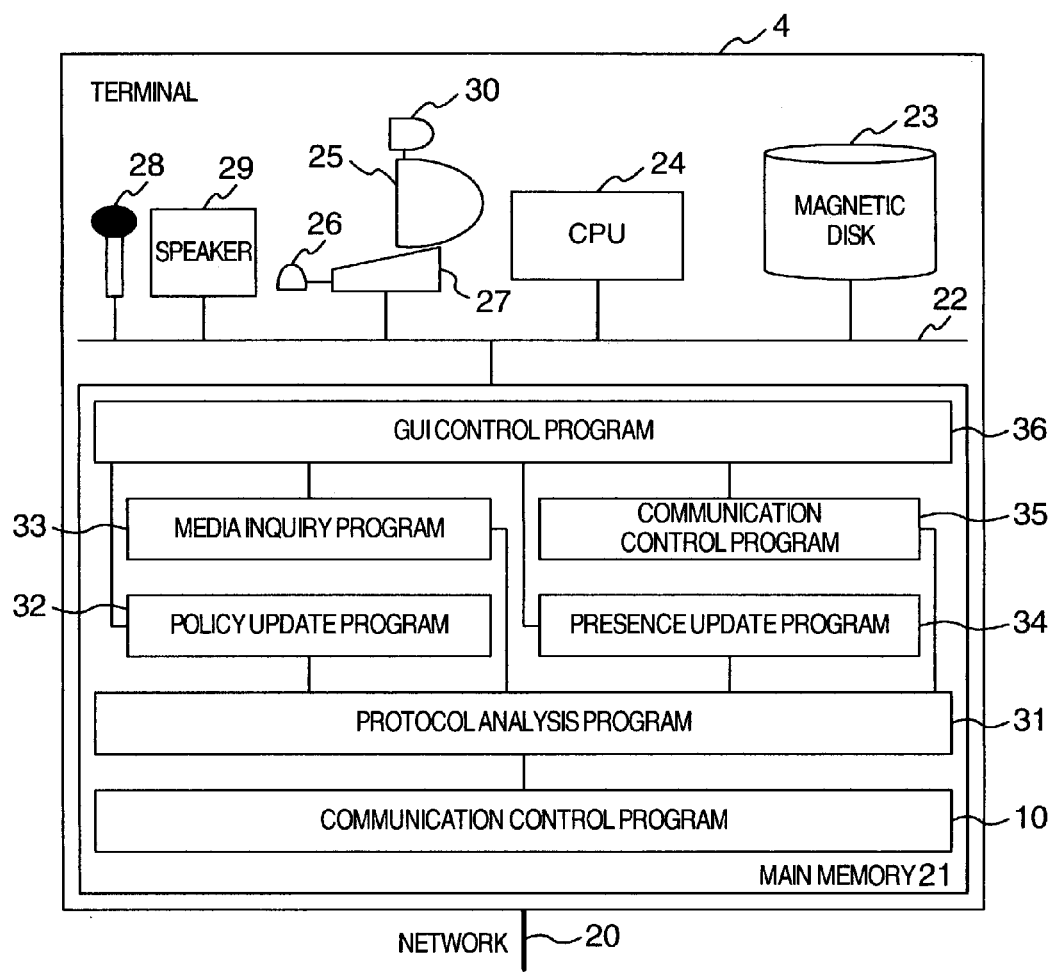
FIG. 6 is a diagram showing a system configuration of a terminal.

FIG. 6 shows an example of system configuration of the terminal 4 according to this embodiment. The terminal 4 consists of a CPU 24, a magnetic disk 23, a main memory 21, a communication line 22 such as a bus, a display 25, a character input device 27, a pointing device 26, a microphone 28, a speaker 29 and a video camera 30, and is connected with other devices through the network 20.

The memory 21 has stored therein a communication control program 10, a protocol control program 31, a policy update program 32 for issuing a policy update request to the control server 1, a media inquiry program 33 for inquiring the control server 1 about the media currently available for the receiving user, a presence update program 34 for issuing a presence update request to the control server 1, a communication control program 35 for executing the session control for multimedia communication and transmitting/receiving the multimedia data, and a GUI control program 36 for supplying the user with a graphical user interface.

These programs are stored in the magnetic disk 23 in advance or by being read from a portable recording medium or by being downloaded from other servers. After being transferred to the main memory 21 as required, the programs are executed by the CPU 24. Depending on the type of the terminal, however, the terminal may not include the microphone 28, the speaker 29 or the video camera 30.

The relay server 2 according to this embodiment plays the role of relaying the session control data for exchange between the terminals. The relay server 2 corresponds to a SIP (Session Initiation Protocol) proxy defined under RFC 3261, for example.

Figure 7:
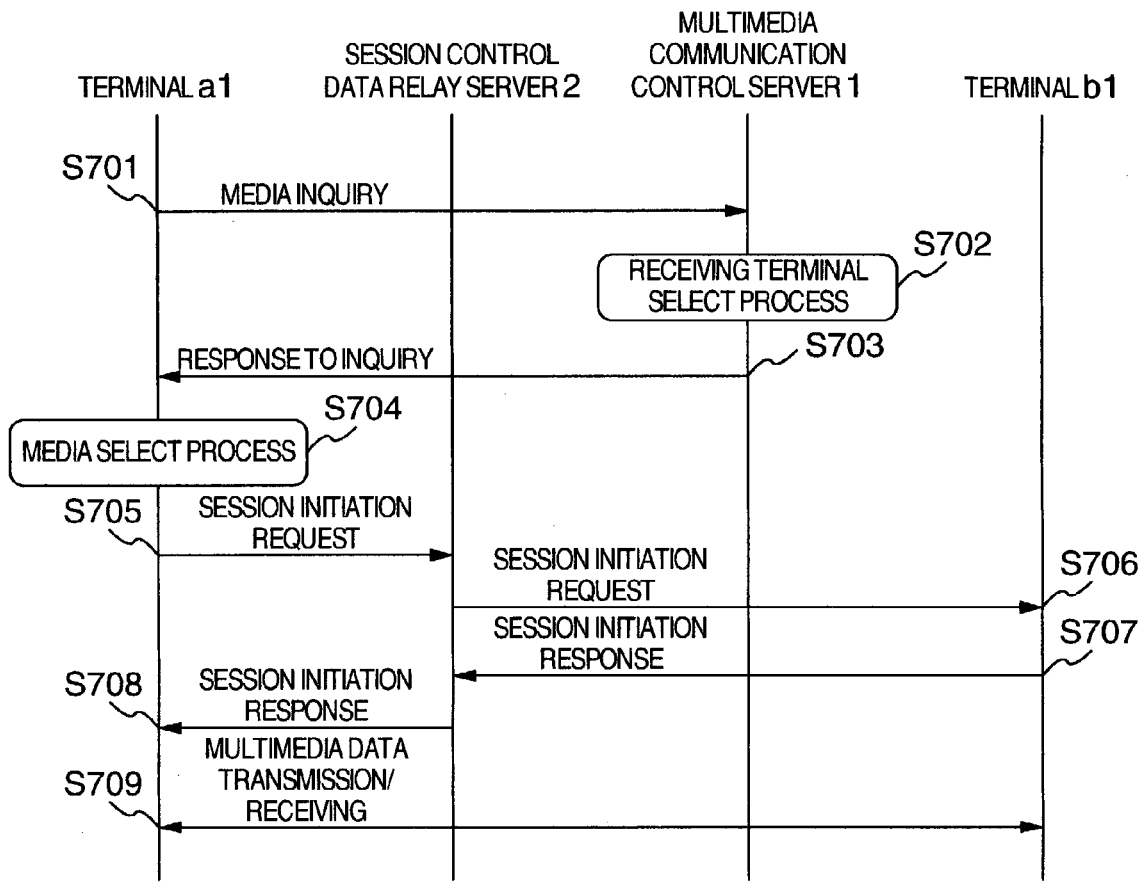
FIG. 7 is a diagram showing a communication sequence according to a second embodiment.

The communication sequence followed by the user a when transmitting a multimedia communication session to the user b by way of the terminal a1 will be explained with reference to FIG. 7.

First, the media inquiry program 33 of the terminal a1 inquires the control server 1 about the receiving terminal of the user b and the media usable by the particular receiving terminal (step S701). As soon as the communication control program 10 of the control server 1 receives the media inquiry, the protocol analysis program 11 analyzes the media inquiry and, after retrieving the user IDs of the transmitting user and the receiving user, the receiving terminal select program 12 executes the receiving terminal select process (step S702). Based on the terminal ID (b1 in FIG. 7) of the receiving terminal of the user b and the media ID of one or more media usable by the particular receiving terminal obtained in the step S702, the protocol analysis program 11 assembles a response to the inquiry and the communication control program 10 sends the response (step S703). The receiving terminal select process according to this embodiment will be described later.

As soon as the communication control program 10 of the terminal a1 receives the response, the protocol analysis program 31 analyzes the response, after which the GUI control program 36 displays on the display 25 a media select screen 800 for selecting the media to be used by the user a (step S704). The media select screen 800 will be explained later with reference to FIG. 8. Once the media is selected by the user a, the protocol analysis program 31 of the terminal a1 assembles a session initiation request to the terminal b1, and the communication control program 10 issues the particular session initiation request to the relay server 2 (step S705).

This session initiation request has added thereto the terminal ID (b1 in FIG. 7) obtained in step S703 and the media ID of one or more media selected by the user a using the the media select screen 800 as additional information. The relay server 2, upon receipt of the session initiation request, transfers it to the terminal b1 (step S706). The subsequent sequences (steps from S707 to S709) are similar to those of steps from S404 to S406 in FIG. 4.

The receiving terminal select process according to this embodiment will be explained. First, steps from S501 to S510 in FIG. 5 are executed. Next, it is determined whether there exists one or more unoccupied media with regard to the terminal with the highest priority (in the case where the user b has only one terminal, the particular terminal makes up "the terminal with the highest priority"). In the case where there exists such medium or media, the terminal ID of the particular terminal and the media ID of all the unoccupied media for the same terminal are returned as a response to the inquiry, and the receiving terminal select process is ended. In the case where there exists no such medium or media, on the other hand, a similar process is repeated for the terminal of the next highest priority, and upon complete processing for all the terminals, an error is returned indicating the absence of usable media.

According to this embodiment, unlike in the first embodiment, an inquiry can be given about the media available for use by the receiving terminal of the user b. As a result, the receivability can be improved.

Figure 8:
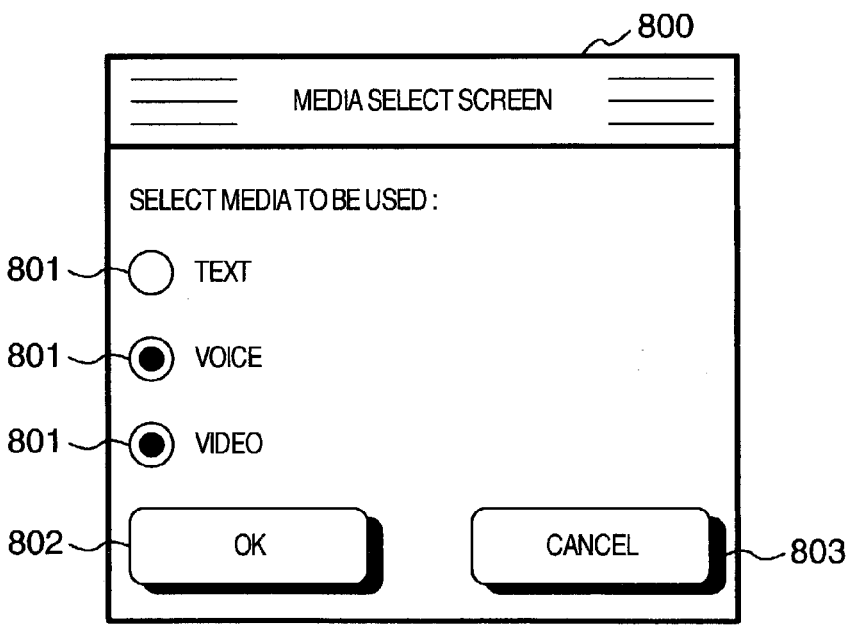
FIG. 8 is a diagram showing a display example of a media select screen according to the second embodiment.

FIG. 8 shows a display example of the media select screen 800. The media select screen 800 is displayed on the display 25 by the GUI control program 36 of the terminal 4, and the user sets each parameter using the character input device 27, the pointing device 26 and so on.

The media select screen 800 consists of buttons 801 for selecting the media used for multimedia communication, a button 802 for starting the multimedia communication and a button 803 for canceling the media selection.

The screen example shown in FIG. 8 indicates that the receiving terminal of the receiving user can use text, voice and the video and the transmitting user has selected voice and video among them as communication media.

In the second embodiment described above, the terminal 4 gives an inquiry to the control server 1 about the media usable by the receiving terminal of the receiving user. In this way, the transmitting user can grasp in advance what media the receiving user can use, thereby improving the receivability.

Incidentally, the relay server 2 may also have the function of the control server 1.

Next, a third embodiment will be explained. According to this embodiment, the control server 1, the existing relay server 2 and the terminal 3 are connected by a network 20 of LAN, etc. thereby making up a multimedia communication system.

In the multimedia communication system according to this embodiment, the communication between the relay server 2 and the terminal 3 is relayed by the control server 1. For the terminal 3 and the relay server 2, therefore, the setting change is not required and the existing devices can be used.

Figure 9:
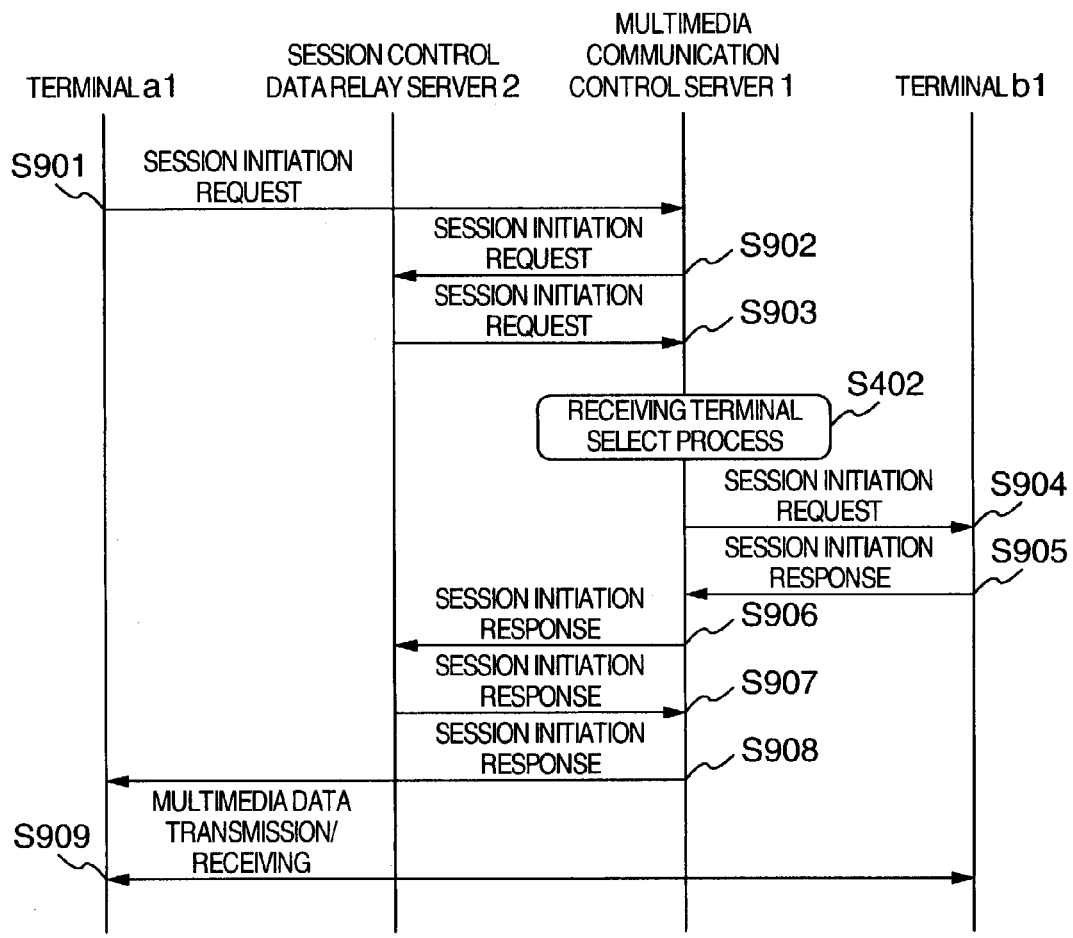
FIG. 9 is a diagram showing a communication sequence according to a third embodiment.

The communication sequence followed by the user a to start the multimedia communication with the user b by way of the terminal a1 will be explained with reference to FIG. 9. First, the terminal a1 issues to the control server 1 a session initiation request for the multimedia communication with the user b. Then, the communication control program 10 of the control server 1 transfers the session initiation request to the relay server 2 (steps S901, S902). Further, the relay server 2 transfers the same session initiation request to the control server 1 (step S903).

Once the communication control program 10 of the control server 1 receives the session initiation request from the relay server 2, the protocol analysis program 11 retrieves the information contained in the session initiation request and executes the receiving terminal select process described in the first embodiment (step S402). The communication control program 10 of the control server 1 transfers the session initiation request to the receiving terminal (the terminal b1 in FIG. 9) thus obtained (step S904). Upon receipt of the session initiation request, the terminal b1 returns a session initiation response to the control server 1, and the communication control program 10 of the control server 1 transfers it to the relay server 2 (steps S905, S906). Further, the session initiation response is transferred to the control server 1 by the relay server 2, and to the terminal a1 by the communication control program 10 of the control server 1 (steps S907, S908). In the last step, the terminals a1 and b1 establish direct connection, after which the multimedia data are transmitted/received by this connection (step S909).

According to the third embodiment described above, the communication between a terminal and the relay server 2 is relayed by the control server 1, whereby a similar effect to the first embodiment can be achieved without changing the conventional terminal or the relay server 2.

Next, a fourth embodiment will be explained. In this embodiment, a media conversion server 5 for media conversion between text and voice is added to the system of the first embodiment, thereby reducing the chance of a receiving failure caused by the incoincidence of usable media between the transmitting user and the receiving user.

Figure 10:
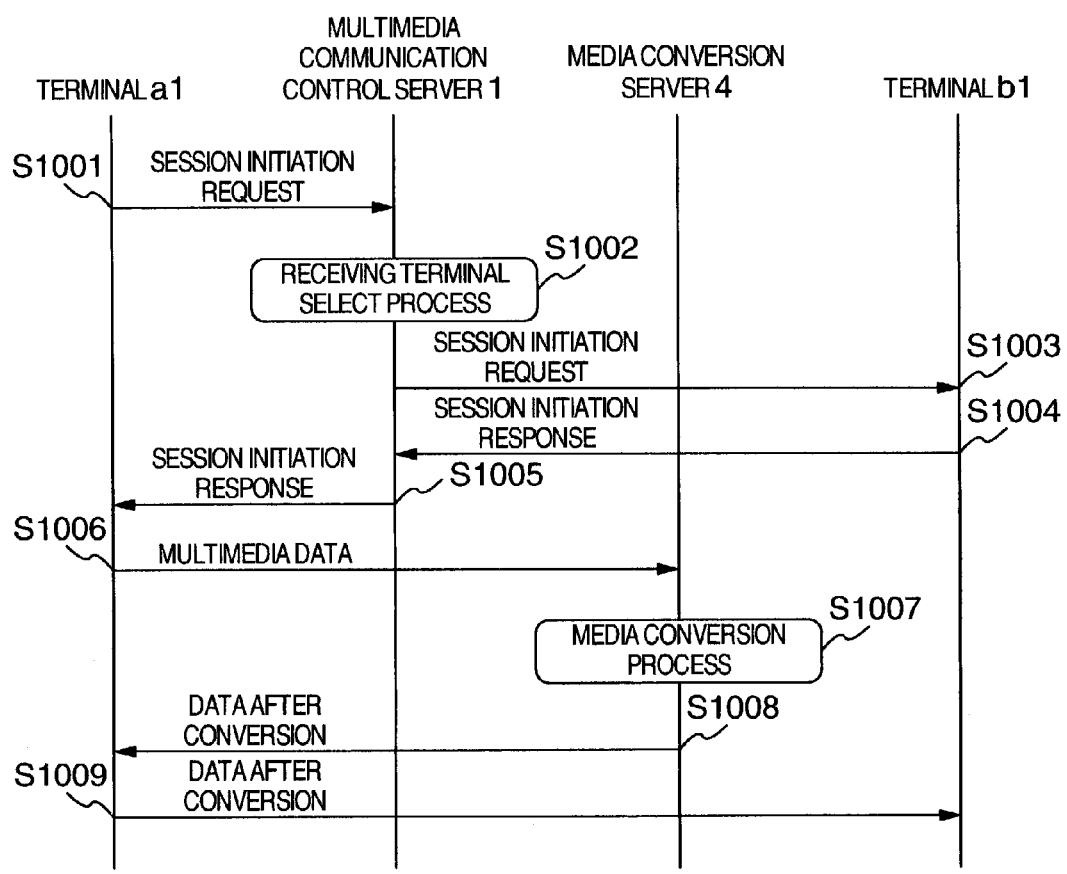
FIG. 10 is a diagram showing a communication sequence according to a fourth embodiment.

The communication sequence followed by the user a to transmit a multimedia communication session to the user b by way of the terminal a1 will be explained with reference to FIG. 10. Steps from S1001 to S1005 are identical with steps from S401 to S405 in FIG. 4. Nevertheless, the receiving terminal select process executed by the receiving terminal select program 12 in step S1002 is different from the corresponding process in FIG. 5 in that the occupied/unoccupied status is changed before step S507 taking the function of the media conversion server 5 into consideration. In the case where the media conversion server 5 has the function of converting a text to a voice and the voice is unoccupied, for example, the record of the text in unoccupied status is added (in the case where the record of the text is already existent, the status is changed to the unoccupied one). In the case where the media conversion server 5 has the function of conversion from voice to text and the text is unoccupied, on the other hand, the record of the voice in unoccupied status is added (in the case where the voice record is already existent, the status is changed to the unoccupied one).

In the case where the terminal a1 transmits the multimedia data requiring media conversion to the terminal b1 after the aforementioned process, the first step is for the terminal a1 to transmit the multimedia data to the media conversion server 5 (step S1006). The media conversion server 5 executes the media conversion process (step S1007), and returns the converted data as a response (step S1008). Depending on the performance of the media conversion server 5, the data after media conversion may be against the intention of the user. For this reason, the terminal a1 that has received the converted data transmits the same data to the terminal b1 after confirming with the user a whether the converted data is to be transmitted or not to the user a (step S1009). Nevertheless, the data may be transmitted to the terminal b1 without such confirmation.

In the fourth embodiment described above, the receiving failure due to the incoincidence of usable media between the transmitting user and the receiving user can be reduced by carrying out the receiving terminal select process taking the media conversion into consideration. Incidentally, this embodiment can be combined with the second embodiment to display the media considering the media conversion on the media select screen 800.

Next, a fifth embodiment will be explained. According to this embodiment, a conference server 6 is added for holding a multimedia conference among three or more users.

The communication sequence for holding a multimedia conference among users a, b, c will be explained with reference to FIG. 11. First, the user a issues a conference reservation to the conference server 6 using the terminal a1 (step S1101). This conference reservation has added thereto the user IDs (a, b, c in FIG. 11) of the participants in the conference and the scheduled date and time of the conference as additional information. With the arrival of the date and time designated by the conference reservation, the conference server 6 issues a media inquiry to the control server 1 (step S1102). This inquiry contains the user IDs (a, b, c in FIG. 11) of the participants in the conference. Next, the protocol analysis program 11 of the control server 1 analyzes the media inquiry and retrieves the user IDs of the participants, after which the receiving terminal select program 12 executes the media select process (step S1103). The first step in the media select process according to this embodiment is to execute the media select process explained in the second embodiment for each user designated in the inquiry. Next, a medium shared by all the participants in the conference is selected, and the medium ID of the particular medium, together with the receiving terminal IDs of the users, is returned as a response to the conference server 6 (step S1104). In the absence of a shared medium, an error is returned to the conference server 6 indicating the media incoincidence. Upon receipt of the error, the conference server 6 transmits an error to the receiving terminal (a1 in FIG. 11) of the users who have reserved for the conference, indicating that the conference could not be held due to the media incoincidence. In the case where the conference server 6 receives the receiving terminal IDs of the users and the media ID, on the other hand, a session initiation request is issued to the receiving terminal of each user (step S1105). After each terminal returns a session initiation response (step S1106), the multimedia data are transmitted/received (step S1107). In this step S1107, the conference server 6 plays the role of synthesizing the multimedia data received by each terminal and transmitting them to the other terminals.

Incidentally, in the case where the conference server 6 receives a conference reservation not containing the scheduled date and time of the particular conference, the process of step S1102 and subsequent steps may be executed immediately.

According to the fifth embodiment described above, a multimedia conference among three or more users can be held in such a manner that the terminals and media used for the conference are selected in accordance with the dynamic situation of the user participants. Incidentally, the media used for the multimedia conference can be increased in number by combining this embodiment with the fourth embodiment.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A multimedia communication system comprising:
    at least one terminal of a user, capable of multimedia communication; and
    a control server for storing presence information of said at least one terminal of the user who uses said at least one terminal, a priority of each terminal used by said user and an occupied/unoccupied status of one or more communication media usable at each terminal;
    characterized in that said control server changes said occupied/unoccupied status of one or more of the communication media of said at least one terminal used by the user in accordance with the presence information of said user and at least one policy,
    wherein the at least one policy comprises a condition for the presence information, information for specifying the communication media, information for specifying the terminal, and action on the occupied/unoccupied status,
    wherein the information for specifying the communication media is information identifying one communication media or information representing all communication media,
    wherein the information for specifying the terminal is information identifying one terminal or information representing all terminals,
    wherein the at least one policy enables the server to select and perform any of a defined group of operations including: i) set the occupied/unoccupied status of all communication media at all terminals used by the user, ii) set the occupied/unoccupied status of one communication medium at all terminals used by the user, and iii) set the occupied/unoccupied status of all communication media at one terminal used by the user,
    further characterized in that said control server enables a system manager or the user to register which operation will be performed dependent upon the user presence information, and
    wherein the at least one policy comprises at least the following policies for selecting an operation:
        when the user is identified, and the presence information of the user is "LINE BUSY", then change status of voice based communication media of all terminals to "OCCUPIED";
        when the user is identified, and the presence information of the user is "ABSENT", then change status of all communication media of the terminal with "ABSENT" presence information to "OCCUPIED"; and
        when the user and a caller are identified, and the identified caller is not a specified caller, then change status of all communication media of all terminals to "OCCUPIED".

2. The multimedia communication system as set forth in claim 1, characterized in that
    said control server, after changing said occupied/unoccupied status, checks the occupied/unoccupied status of one or more media designated in advance, in a preassigned descending order of priority for each terminal of said user, and selects a terminal with all said media unoccupied as a receiving terminal.

3. The multimedia communication system as set forth in claim 2, characterized in that
    said control server, after receiving a session initiation request with the ID of one or more designated media from a transmitting terminal to said user, first checks the occupied/unoccupied status of said designated medium or media.

4. The multimedia communication system as set forth in claim 3, characterized in that
    said control server, after receiving the session initiation request with the ID of one or more designated media from a transmitting terminal to said user, transfers said session initiation request to said selected receiving terminal.

5. The multimedia communication system as set forth in claim 1, further comprising a media conversion server,
    characterized in that said control server, in a process of changing said occupied/unoccupied status, sets the media before media conversion in an unoccupied status in the case where the media after media conversion by said media conversion server is unoccupied.

6. The multimedia communication system as set forth in claim 1, characterized in that
said control server changes said occupied/unoccupied status in accordance with at least one policy including conditions for the user on a transmission side and contents of changing said occupied/unoccupied status.

7. The multimedia communication system as set forth in claim 1, characterized in that
said control server changes said occupied/unoccupied status in accordance with at least one policy including conditions for time and contents of changing said occupied/unoccupied status.

8. The multimedia communication system as set forth in claim 1, characterized in that
said control server, after changing said occupied/unoccupied status, selects all the unoccupied media at the terminal with the highest priority of said user.

9. The multimedia communication system as set forth in claim 8, characterized in that
said control server transmits the IDs of all said selected unoccupied media to a transmitting terminal.

10. The multimedia communication system as set forth in claim 9, characterized in that
said transmitting terminal receives the IDs of said media from said control server, displays the names of the media corresponding to said media IDs to a user of said transmitting terminal, prompts said user of said transmitting terminal to select one or more media and initiates a multimedia communication session with the media selected by said user of said transmitting terminal.

11. The multimedia communication system as set forth in claim 8, characterized in that
in the case where a plurality of receiving users are involved, said control server, in said media select process, selects one or more media usable by all of said users at the same time.

12. The multimedia communication system as set forth in claim 11, characterized in that
said control server transmits a session initiation request with said selected common media to the receiving terminal of highest priority order of each of a plurality of said users.

13. The multimedia communication system as set forth in claim 1, wherein the policy includes the contents of the operation of changing said occupied/unoccupied status in accordance with a condition for a caller.

14. The multimedia communication system as set forth in claim 1, wherein the policy includes the contents of the operation of changing said occupied/unoccupied status in accordance with a condition for time.

15. A multimedia communication system comprising:
multiple terminals associated with a user, at least one of said terminals being a multimedia terminal; and
a control server configured to perform at least the following functions:
  (A) associate a first terminal identification, a first priority, and a first communication information with the user; and associate a second terminal identification, a second priority, and a second communication information with the user,
  (B) associate a media identification and a status with the first terminal identification, and associate a media identification and a status with the second terminal identification,
  (C) selectively associate user presence information with the first terminal identification and with the second terminal identification,
  (D) perform an operation dependent upon the user presence information, wherein the operation is selected from a group of operations comprising: i) set the occupied/unoccupied status of all communication media at all terminals used by the user, ii) set the occupied/unoccupied status of one communication medium at all terminals used by the user, and iii) set the occupied/unoccupied status of all communication media at one terminal used by the user, and
  (E) enable a system manager or the user to register which operation will be performed dependent upon the user presence information, and
  (F) determine an operation based on at least one policy, wherein the at least one policy comprises at least the following policies for selecting an operation:
    when the user is identified, and the presence information of the user is "LINE BUSY", then change status of voice based communication media of all terminals to "OCCUPIED";
    when the user is identified, and the presence information of the user is "ABSENT", then change status of all communication media of the terminal with "ABSENT" presence information to "OCCUPIED"; and
    when the user and a caller are identified, and the identified caller is not a specified caller, then change status of all communication media of all terminals to "OCCUPIED".

16. The multimedia communication system of claim 15, wherein user presence information is selected from a group comprising: on-line, off-line, absent, engaged, and line-busy.

17. The multimedia communication system of claim 16, wherein the at least one policy condition asserts that if the user presence information is engaged, then the status is set to occupied for all media at all terminals associated with the user.

* * * * *